United States Patent [19]

Todd, Jr. et al.

[11] 4,283,429

[45] Aug. 11, 1981

[54] LIQUID SEASONING COMPOSITIONS I

[75] Inventors: Paul H. Todd, Jr.; Howard E. Haley, both of Kalamazoo, Mich.

[73] Assignee: Kalsec, Inc., Kalamazoo, Mich.

[21] Appl. No.: 125,423

[22] Filed: Feb. 28, 1980

[51] Int. Cl.$^3$ .............................................. A23L 1/221
[52] U.S. Cl. .................................... 426/250; 426/540; 426/590; 426/650; 426/651
[58] Field of Search ............... 426/651, 650, 250, 540, 426/654, 590

[56] References Cited

U.S. PATENT DOCUMENTS

| 2,032,612 | 3/1936 | Griffith | 426/651 |
|---|---|---|---|
| 2,508,978 | 5/1950 | Tribble | 426/651 |
| 2,566,410 | 9/1951 | Griffin | 426/651 |
| 2,626,218 | 1/1953 | Johnstone | 426/651 |
| 2,860,054 | 11/1958 | Yanick | 426/651 |
| 3,622,343 | 11/1971 | Anwar | 426/651 |
| 3,674,502 | 7/1972 | Honey et al. | 426/651 |
| 3,906,116 | 9/1975 | Quesnel | 426/651 |

Primary Examiner—Jeanette M. Hunter
Attorney, Agent, or Firm—Gordon W. Hueschen

[57] ABSTRACT

A homogeneous liquid condimental composition, useful in flavoring or coloring foods and beverages and which is dispersible in both oil and water, consisting essentially of (1) hydroxylated lecithin, (2) tartaric acid esters of mono- and diglycerides, and (3) one or more condiments selected from edible flavorings and edible colorings, the ratio by weight of (1) plus (2) to (3) being at least 1:4, preferably at least 1:3, especially about 1:1, the condiment portion (3) preferably comprising at least one condiment selected from the group consisting of (a) spice oleoresins, (b) essential oils, and (c) edible colorings, the ratios by weight of (2) to (1) preferably being between about 1:3 and 3:1, and the condiment portion (3) preferably comprising oleoresin black pepper.

17 Claims, No Drawings

LIQUID SEASONING COMPOSITIONS I

FIELD OF INVENTION

Liquid condimental compositions comprising edible flavorings and/or edible colorings; seasoning, flavoring, or coloring of foods and beverages using liquid spice flavorings and colorings; foods and beverages so flavored, seasoned, or colored.

PRIOR ART

The seasoning or flavoring, e.g., spicing, of foods has been accomplished in the following manner:

a. Ground Spices. This has been the traditional approach, and is still used as the primary method in the home kitchen. In more advanced technological applications, such as commercial food processing, it has been replaced by employment of spice oleoresins, which offer cleanliness and uniformity.

b. Oleoresins have traditionally been used in the following forms:

1. Directly. Oleoresin paprika, for example, is mixed with salad oil, and added to vinegar to make a separating French dressing.
2. As dispersions on salt or dextrose. In the case of a French dressing, black pepper oleoresin may be dispersed on salt and added to the vinegar with agitation in the presence of the oil and paprika oleoresin mixture. The black pepper oleoresin will, for the most part, be dissolved into the oil phase if agitation is sufficient.
3. Black pepper oleoresin may alternatively be added to the food in a liquid form, according to:
    i. U.S. Pat. Nos. 2,680,690 and 2,626,218 (Johnson and Schumm), wherein the oleoresin black pepper is claimed to be dissolved in anhydrous organic acids, such as lactic. This approach suffers from three disadvantages in practice:

(1) Not all of the pepper essential oil is soluble, and two-phase systems result which cannot be evenly incorporated into the food. Flavor variation results. (2) Piperine, the pungent principle of pepper, may crystallize on storage. (3) The liquid pepper is not readily dispersible in oil phase systems.

ii. U.S. Pat. No. 2,860,054 (Yanick) utilizes less organic acid than the above, and substitutes therefor ethyl alcohol and an acetate moity. This invention has the advantage over the Johnson-Schumm developments in contributing less acidity to the food, but shares their other disadvantages, and in addition may change in composition due to evaporation of alcohol.
4. Oleoresins may be mixed with Polysorbate 80 USP in an amount sufficient to dissolve them and to emulsify them in aqueous systems (generally the amount is more than 200% by weight of the oleoresin), and added to the aqueous phase of the system. These mixtures cannot be added to the oil phase. In addition, Polysorbate 80, even in trace amounts, will break the emulsions present in naturally emulsified systems such as mayonnaise. The Polysorbate itself has objectionable flavors, can contain a toxic substance known as 1,4-dioxane, and accelerates the development of rancid and other off-flavors.
5. The oleoresins may be spray-dried, using gums, and added to the food after mixing with sugar, starch, or water. Spray-dried products have great stability, but are expensive to produce, cannot be made from some oleoresins, and a significant portion of the volatile flavors is lost in the spray-drying process.

It is apparent from the foregoing that improved, economic, efficient, and more universally utilizable food and beverage flavoring, seasoning, and/or coloring systems, which are not characterized by inherent shortcomings and deficiencies of available prior art systems, would be highly desirable and would fulfill a long-felt need in the art. Such systems are provided by the present invention.

A summary of major advantages and disadvantages of the previously existing systems, as discussed in the foregoing, is provided in Table I. A summary of foods for which these systems can be utilized is provided in Table II. Both tables also provide the same information for flavoring compositions according to the present invention.

OBJECTS OF THIS INVENTION

The primary object of this invention is to provide a condimental system which is dispersible in both oil and water phases of a food or beverage. A second objective of this invention is to provide a single formulation which is compatible with spice oleoresins, essential oils, and natural and synthetic flavorings and colorings used in foods, beverages, or in other applications where humans or animals require non-toxic dispersing agents in the substances ingested or exposed to the oral cavity. A third objective of this invention is to overcome the deficiencies in the prior art related to the use of oleoresin black pepper, and at the same time make the water and oil dispersible black pepper flavoring composition compatible with other water and oil dispersible spice flavoring compositions, essential oils, and food colorings. A fourth objective is to provide a condimental system which has no functional effect in the food other than the dispersion of the condiment at the time of incorporation and which, for example, does not affect the usual or natural emulsions or particle aggregation in the food. A fifth objective is to provide a liquid condimental system which is stable indefinitely, particularly to oxidation and other forms of deterioration on storage, and the ingredients of which are similarly stable indefinitely. A sixth objective is to provide a condimental system which is compatible with the various additives found in commercial oleoresins, such as lactic acid, mono and di-glycerides, and begetable oils. A seventh objective is to provide a single system which will distribute flavorings or coloring between the water and oil phases of a food, depending upon the affinity of the flavor or coloring for the oil or water phase. An eighth objective is to provide a single system which will serve to flavor and color juices and beverages, especially those in which pulp or a cloud is present.

Additional objectives are:

To provide a liquid flavoring system which is compatible with all spice and herb oleoresins and essential oils. To provide a spice flavoring system in which any desirable mixture of flavors can be added to the food or beverage as a single liquid. To provide a liquid flavor which will not precipitate, separate, or stratify on standing and shipping. To provide a flavoring system which will not contribute off-flavors to the food because of its ingredients, or because its ingredients are pro-oxidants. To provide a flavoring system which can be added to the oil phase, the water phase, or both phases simultaneously in the preparation of the food or beverage. To provide a flavoring system which can be used in conjunction with special applications, such as in conjunction with the coloring of pickles covered with a flavored salt brine or sugar syrup, e.g., in accord with our copending application Ser. No. 125,424, filed Feb. 28, 1980, filed even date herewith. To provide a flavoring and coloring system which is not dependent upon the pH of the food or beverage. To provide a flavoring system which is more economical than those presently in use. To provide a sterile flavoring. Still other objects will be apparent to one skilled in the art and additional objects will become apparent hereinafter.

All of the foregoing and additional objects are achieved by the provision of the flavoring, seasoning, or coloring compositions of the present invention and the foods and beverages flavored, seasoned, or colored therewith.

GLOSSARY OF TERMS

The following identification of terms will allow the reader to better understand the specific technical aspects of this invention:

Spices and Herbs:

Aromatic and/or colored edible vegetable substances, the significant function of which is seasoning food. These are edible flavors or seasonings.

Oleoresin:

Spice oleoresins are derived from spices and contain the sapid, odorous, and related characterizing principles of the spice. They are produced by the solvent extraction of a ground spice, with subsequent solvent removal and occasionally purifying steps to remove unwanted components, such as waxes and chlorophyll. Also an edible flavor or seasoning.

Essential Oil:

The volatile oil obtained from the plants (spices and herbs). This oil usually has the characteristic (essential) odor and flavor of the spice. It is most commonly steam distilled from the spice. Another edible flavor or seasoning.

Condiment:

A substance, or mixture of substances, the effect of which in a food or beverage is seasoning, flavoring and/or coloring, and which is soluble in a solvent or volatile with steam. Encompasses edible flavors or seasonings and edible colorings.

Polysorbate 80:

Polysorbate 80 USP is a partial ester, non-ionic, surface-active emulsifying agent produced by condensing ethylene oxide with sorbitan monooleate in the mole ratio of about 20:1, the latter being prepared by reacting refined sorbitol with refined oleic acid.

Polyglycerol Esters of Fatty Acids:

Polyglycerol partial esters of edible fats and/or their fatty acids, up to and including the decaglycerol esters. Usually produced by first polymerizing glycerine to form a molecule from diglycerol to decaglycerol in length, then esterifying with selected fatty acid materials this polymerized glycerine or polyol. For some purposes, such materials having at least three and preferably at least six glycerol moieties are required. For other purposes, this is not a requirement.

Brine and Syrup:

Water or vinegar containing one percent or more salt and/or sugar (weight per volume) as commonly used in pickles and beverages and less frequently in other food applications.

Lecithin:

Usual definition. Phosphatides and phospholipides, usually obtained as by-products of the extraction of soy bean oil.

Hydroxylated Lecithin:

Usual definition. A waxy mixture of phosphatides, usually obtained from soybeans, hydroxylated to add hydroxyl (OH) groups.

Tartaric Acid Esters of Mono- and diglycerides:

Obtained by esterification reaction of tartaric acid, and usually also acetic acid, with a distilled monoglyceride, commonly referred to as data esters and widely used as a dough conditioner. Usually contains one or more acetate moieties in addition to the tartarate moiety, although this is not essential. Usually some very small percentage of triglyceride is also present. Hereinafter sometimes abbreviated "tartaric acid esters".

"w/o Flavor":

An abbreviation for "water and oil dispersible flavor" used herein to designate a water and oil dispersible condimental liquid system which is an object of our invention, described in the specification and examples, and claimed in the claims hereof.

"Consisting Essentially of"

According to established practice, this phrase means that the necessary stated ingredients are present in the necessary stated amounts, but that the presence of other ingredients or additaments which do not interfere with attainment of the objectives of the invention is not precluded. In this sense, it is to be noted that diluting and/or standardizing agents, such as vegetable oils, propylene glycol, lactic acid, ethanol, mono- and diglycerides and esters thereof, hydroxylated lecithin, sorbitan fatty acid esters, etc., are not excluded, to the extent that they do not interfere with attainment of the objectives of the invention.

Foods and beverages:

The usual solid or liquid foods and the usual beverages including juices, as well as candies, gums, sweetmeats, medicines, including mouthwashes and gargles, and like ingestible or orallyacceptable materials, including all other types of drinkables and chewables.

Edible Colorings:

Any pigment or other coloring which is ingestible or orally acceptable and which, like all flavorings or seasonings, are preferably but not necessarily "generally recognized as safe" (GRAS). Many are disclosed hereinafter.

MATERIALS EMPLOYED

Lecithin—Central Soya Commercial Lecithin having as representative composition: phosphatidyl choline 20%, phosphatidyl ethanolamine 20%, inositol phosphatides 21.5%, soybean oil 34%, misc. (sugars, sterols, moisture, etc.) 4.5%.

Hydroxylated Lecithin—Central Soya "Centrolene A" (TM) for its brand of hydroxylated lecithin, having a composition approximately as follows: acetone insolubles 60%, moisture 2%, benzene insolubles 0.1%, other lipids 35%.

Panodan SD—(TM) for Grinsted Products, Inc. brand of GRAS FDA-approved diacetyl tartaric acid ester of monoglycerides. Saponification value 400–420; acid value 62–76; iodine value 75–85; color yellow; clear mp. ca, 35° C./95° F.; form—semiliquid; antioxidant added: phosphoric acid max 200 ppm; BHA max 200 ppm.

Panodan FD (TM) and Panodan 235 (TM) are also suitable for use instead of SD.

Polysorbate 80—USP specifications. Usually ICI Tween 80 (TM) brand.

Sorbitan Monooleate and Trioleate—Mazer Chemicals, Inc.—S-MAZ 80 (TM) brand; sap. no. 149–160, hydroxy no. 193–209; amber liquid. The corresponding ICI sorbitan monoleate product is Span 80 (TM). S-MAZ 85 (TM) is the corresponding trioleate having a sap. no. of 172–186 and hydroxy no. of 56–68. The corresponding ICI sorbitan trioleate product is Span 85 (TM).

Sorbitan Fatty Acid Esters—Mazer Chemicals, Inc. S-MAZ (TM) brand are suitable; series 20 through 90 are various nonionic lipophilic fatty acid esters having varying degrees of surfactant activity.

Polyglycerol Faty Acid Esters

Triglycerol monostearate—Santone 31S (TM) brand by Durkee, Inc. Div of SCM; Mazol PGS-31 (TM) of Mazer Chemicals.

Triglycerol monooleate—Mazol PGO-31 (TM) of Mazer Chemicals, Inc.

Octaglycerol monooleate—Santone 8-1-O (TM) brand by Durkee, Inc.

Octaglycerol monostearate—Santone 8-1-S (TM) brand by Durkee, Inc.

Decaglycerol monocaprylate—caproate—Drewmulse 10-1-CC (TM) of PVO International, Inc. for its brand of decaglycerol ester of caprylic and capric acids. Sapon. no. 85–105; acid no. 3 max.; hydroxyl no. 610–660.

SUMMARY OF THE INVENTION

The present invention relates, inter alia, to a homogeneous liquid condimental composition, useful in flavoring or coloring foods and beverages and which is dispersible in both oil and water, consisting essentially of
(1) hydroxylated lecithin,
(2) tartaric acid esters of mono- and diglycerides,
and (3) one or more condiments selected from edible flavorings and edible colorings,
the ratios by weight of (1) plus (2) to (3) being at least 1:4, preferably at least 1:3; such compositions wherein the condiment portion comprises at least one condiment selected from the group consisting of (a) spice oleoresins, (b) essential oils, and (c) edible colorings, preferably wherein the ratio by weight of (2) to (1) is between about 1:3 and 3:1, and wherein the spice oleoresin is oleoresin black pepper; such compositions, wherein ingredients (1) and (2) are preferably present in about a 1:1 weight ratio, and especially wherein ingredients (1), (2), and (3) are present in about a 1:1:2 ratio by weight; such compositions comprising an edible coloring in an amount between about one and about twenty percent by weight of the composition; such compositions, wherein the edible coloring is selected from the group consisting of annatto extract, bixin, norbixin, lycopene, capsanthin, beta-apo-8 carotenal, and beta-carotene; such compositions comprising at least one preferentially water-soluble condiment, said compositions being dispersed in water and then admixed with oil, said water-soluble condiment being present in the aqueous phase; such compositions, wherein the condiment portion in the composition is other than oleoresin black pepper, blended with a stable homogeneous oleoresin black pepper composition; such compositions, wherein a portion of either or both of (1) and (2) is replaced by a polyglycerol having six or more glyceride linkages which is essentially a monoester of a fatty acid, in an amount of up to about fifty percent of the combined weight of (1) and (2); and foods or beverages seasoned, flavored, or colored with such a condimental composition.

RATIOS OF INGREDIENTS

Although the weight ratio of (1) and (2) combined to condiment in the composition of the invention is at least 1:4 by weight, most preferably about 1:1 by weight, usually at least 1:3 and ordinarily between about 1:3 and 10:1, the upper limit is determined only by reasons of practical economy and there is theoretically no reason why much higher ratios cannot be employed. When annatto extract, bixin, or norbixin is present in the composition of the invention, such condiment most usually is present in an amount of at least one percent, usually 1–20%, by weight of the composition, and this is generally true for all coloring materials, whether natural or synthetic, and whether present in the composition of the invention alone or together with a flavoring material.

Pure pigments by themselves, because they are usually solids by themselves are, if used alone, most easily handled at ratios of 4:1 to 10:1. If, because of their intense coloring power, more dilute dispersible pigments are desired, either propylene glycol or other additaments may be used for dilution and standardization. The preferred weight ratio of tartaric ester (2) to hydroxylated lecithin (1) according to the invention is between about 1:3 and 3:1, as illustrated by Table A of Example G, and the preferred ratios of combined (1) and (2) to condiment are illustrated by Table B of Example G as well as by the other Examples provided herein.

DETAILED DESCRIPTION OF THE INVENTION

The following Examples are given by way of illustration only and are not to be construed as limiting:

Description of Compositions (Formulations) and Preferred Embodiments

Example A. Hydroxylated lecithin and tartaric acid esters.

A mixture of 25% hydroxylated lecithin, 25% tartaric acid esters*, and 50% oleoresin paprika were mixed with warming. The mixture, when cool, was homogenous. When dropped into water, it dispersed with some small visible droplets being present. In hot water, the dispersion was better. Upon standing, the color slowly floats out. The color is readily dispersible in oil.

* Panodan SD, whenever asterisked herein

Example B. Hydroxylated lecithin, tartaric acid esters, and polyglycerol esters.

A mixture of 12.5% hydroxylated lecithin, 12.5% decaglycerol caprylate-caprate**, 25% tartaric acid esters*, and 50% oleoresin paprika were mixed with warming. The resulting mixture was homogenous on cooling. Upon dropping into water, it dispersed evenly upon shaking. Upon standing, the color slowly floats out. The color is readily dispersible in oil.

** Drewmulse 10-1-CC(TM)

The same result is obtained when one-half of the tartaric acid ester* content is also replaced by the decaglycerol caproate-caprylate, making the glycerol content about 25%. Although some of the water and oil solubility advantages are reduced, the dispersibility is still acceptable.

Example C. Hydroxylated lecithin and tartaric acid esters.

The preferred embodiment of this invention, because of the formulation being universally applicable to mixtures of condiments, is 25% hydroxylated lecithin, 25% tartaric acid esters*, and 50% oleoresin, such as black pepper or paprika. When paprika is used, for example, the color disperses easily on shaking, floats out very slowly, and may readily be dispersible after float-out by simple shaking. The color is readily dispersible in oil.

Example D. Use of any of the above dispersing agents singly.

When the oleoresin, e.g., oleoresin paprika, is warmed to effect solution in tartaric acid esters*, it will not disperse satisfactorily in water. This is also the case with mixtures of oleoresin and hydroxylated lecithin. With polyglycerol esters, paprika oleoresin is substantially immiscible, since paprika oleoresin and polyglycerol esters are poor mutual solvents for each other.

Example E. Use of polyglycerol esters and either hydroxylated lecithin or tartaric esters* (comparative example).

Since polyglycerol esters are compatible with tartaric acid esters and hydroxylated lecithin, and paprika oleoresin is compatible with such mixtures, an evaluation of the synergistic effect of hydroxylated lecithin and tartaric acid esters can be made.

Mixtures of 50% paprika oleoresin, 25% decaglycerol monocaproate-caprylate**, and 25% of either hydroxylated lecithin or tartaric acid esters* were made. The mixtures dispersed upon addition to water and shaking, but a large number of droplets of paprika, visible to the eye, remained. Float-out was rapid.

This example shows the desirability of having both hydroxylated lecithin and tartaric acid esters present to achieve acceptable water dispersibility, as well as oil dispersibility.

As shown in Example B, however, up to one-half of the combined amount of hydroxylated lecithin and tartaric acid esters may be replaced by the glycerol without rendering the product unacceptable.

Example F. Use of sorbitan monooleate in place of all hydroxylated lecithin (comparative example).

Since sorbitan monooleate is compatible with tartaric acid esters, and paprika oleoresin is compatible with such mixtures, an evaluation of the effect of totally replacing the hydroxylated lecithin with sorbitan monooleate can be made.

Mixtures of 50% paprika oleoresin, 25% sorbitan monooleate***, and 25% of tartaric acid esters* are prepared. The mixture is dispersed upon addition to water and shaking, but a large number of droplets of paprika, which were visible to the eye, remained. Float-out was rapid. These paprika compositions at best are barely marginally acceptable. With oleoresin black pepper, piperine crystallizes out upon standing.

*** S-MAZ 80 (TM)

This example again shows the desirability of having both hydroxylated lecithin and tartaric acid esters present to achieve acceptable water dispersibility as well as oil dispersibility.

Example G. Ratios of hydroxylated lecithin to tartaric acid esters of mono- and diglycerides.

In this experiment, hydroxylated lecithin and tartaric acid esters were combined in varying ratios. An equal part (by weight) of this mixture was combined with an equal part of oleoresin paprika, an oleogenous extract containing a large amount of vegetable oil, and with an equal part of oleoresin cinnamon, a much more polar extract.

The dispersibility of each mixture was observed, as well as the tendency to "float out" upon standing for twenty-four hours.

The results, summarized in Table A, show that ratios of from about 25% to 75% tartaric acid esters to hydroxylated lecithin will satisfactorily disperse these two very different types of oleoresins. In practice, it is recommended that the ratio be on the order of 50:50 for best results.

TABLE A

Effect of varying ratios of tartaric acid esters of mono- and di-glycerides* and hydroxylated lecithin upon the dispersibility and stability of oleoresin paprika and oleoresin cinnamon.

| Solvent, % | | | Dispersibility | | Stability (Overnight) | |
|---|---|---|---|---|---|---|
| Ester | | Hydroxylated Lecithin | Paprika | Cinnamon | Paprika | Cinnamon |
| 0 | | 100 | incomplete | incomplete | floats | flocculates |
| 10 | | 90 | incomplete | improved, but poor | floats | flocculates |
| 25 | 1:3 | 75 | incomplete | disperses | floats | remains suspended |
| 50 | 1:1 | 50 | disperses | disperses | slight float of color, re-dispersible | remains suspended |
| 75 | 3:1 | 25 | disperses | disperses | slight float of color, re-dispersible | gummy, undispersible material forms |
| 90 | | 10 | disperses | disperses | slight float of color, re-dispersible | undispersible |
| 100 | | 0 | disperses | disperses | some float | undispersible |

CONCLUSIONS:

1. Ratios of Ingredients: Preferably more than 25% and optimally about 50% of the mixture is pure oleoresin and essential oil, as neither the tartaric acid esters nor the hydroxylated lecithin readily disperse by themselves in oil or water.

Non-polar, low density oleoresins, such as oleoresin paprika, are usually the most difficult to disperse without float-out. As Table B shows, about 25% by weigh is the minimum amount of hydroxylated lecithin plus tartaric acid esters which is effective. In practice, about 50% by weight hydroxylated lecithin and tartaric acid esters is trouble-free.

TABLE B

Effect of varying proportions of hydroxylated lecithin plus tartaric acid ester mixture to oleoresin upon dispersibility and "Floating out" of oleoresin paprika. (Mixture consists of 50% tartaric acid esters of mono- and diglycerides,* 50% hydroxylated lecithin.)

| % Oleoresin | % Solvent | Dispersibility Immediate | Overnight |
|---|---|---|---|
| 90 | 10 | partial | much float out, not totally redispersible |
| 80 | 4:1  20 | some non-dispersible drops | some float out, mostly redispersible |
| 75 | 3:1  25 | a few non-dispersible drops | some float out, mostly redispersible |
| 50 | 1:1  50 | readily dispersbile | slight float out, readily redispersible |

2. Other substances, such as propylene glycol, lactic acid, ethanol, and vegetable oil may be present at levels of not more than about 10% by weight. At levels above 10%, they may cause separation of the ingredients.

Still other food-grade edible solvents and emulsifiers, such as mono- and diglycerides of fatty acids, sorbitol and its derivatives, etc., which are sometimes incorporated in the oleoresin according to the practice of the art, may be present, but their presence contributes little or no advantage.

Representative of these additaments are:
lactic acid esters of mono- and diglycerides
acetic acid esters of mono- and diglycerides
triglycerol monooleate
hexaglycerol distearate
monoglycerol monooleate (see Example F)
sorbitan monooleate.

EXAMPLES PROVIDING DETAILED DESCRIPTION OF THE APPLICATION OF THE COMPOSITIONS OF THIS INVENTION

The following examples describe the application of this invention. When not noted otherwise, the "w/o flavor" consists of blends of specific oleoresins, these oleoresins being compounded from 50% spice oleoresin, 25% tartaric acid esters*, and 25% hydroxylated lecithin. The blends are stable against precipitation and development of rancidity.

1. Wieners.

The 50% spice oleoresin portion of the "w/o flavor" comprises 6% coriander, 20% nutmeg, 10% capsicum, 4% clove, 50% paprika, and ginger, 10%. The flavoring composition is added during the chopping of the wiener emulsion, at a rate of 1.4 oz. per 100 pounds of finished product. The wiener emulsion can be made according to the recipe:

| Lean Beef (22% fat) | 58 | lbs. |
|---|---|---|
| Pork Trim (50% fat) | 42 | lbs. |
| | 100 | lbs. |
| Water | 5.0 | lbs. |
| Ice | 25.0 | lbs. |
| Salt | 3.0 | lbs. |
| Corn Syrup Solids | 2.0 | lbs. |
| Ground Mustard | 1.0 | lbs. |
| Liquid Smoke | 2.0 | oz. |
| Garlic Powder | 0.25 | oz. |
| Sodium Erythorbate | 0.875 | oz. |
| Sodium Nitrate | 0.250 | oz. |

2. Chicken Soup Base.

The 50% spice oleoresin portion of the "w/o flavor" comprises black pepper 30%, celery 20%, turmeric 7%, marjoram 15%, thyme 15%, and sage 13%. This flavoring composition is added at the rate of one pound to 1,000 pounds of a dry soup base, consisting of:

| Monosodium Glutamate | 75 | parts |
|---|---|---|
| Onion Powder | 20 | parts |
| Toasted Onion Powder | 5 | parts |
| Wheat Starch | 75 | parts |
| Dextrose | 90 | parts |
| Salt | 50 | parts |
| Vegetable Shortening | 60 | parts |
| Chicken Fat | 30 | parts |
| Parsley Flakes | 1 | part |
| Hydrolyzed Vegetable Protein | 10 | parts |

The soup base is added to water at the rate of one ounce to a quart, and is ready when warm.

3. Mayonnaise.

The "w/o flavor" flavoring composition for mayonnaise can contain the following as the spice oleoresin portion:

| Black Pepper | 1.75% |
|---|---|
| Paprika | 2.00 |
| Tarragon | 0.50 and |
| Capsicum | .25 |

The "w/o flavor", containing the above spices, is added to water, q.s. 100 parts. This flavoring mixture is used at a rate of 0.16% by weight in finished mayonnaise and may be added with the vinegar or water in the following recipe.

Procedure and Formula
Use a Hobart mixer—three speed with a wire whip.
Dry mix at a medium speed.

| Salt | 14 | parts |
|---|---|---|
| Sugar | 18 | parts |
| Mustard Flour | 4.5 | parts |

Then add:

| Whole Egg | 170 | parts |
|---|---|---|
| Water | 42.0 | parts |
| Liquid Flavoring | 2.0 | parts |
| Vinegar (200 grain) | 22.0 | parts |

Then slowly add with mixer at high speed:

| Vegetable Oil | 948.0 | parts |
|---|---|---|
| Water - After Oil | 20.0 | parts |

Fill into containers, seal, label and case.

4. Catsup.

The spice oleoresin portion of the "w/o flavor" comprises clove 32%, cinnamon 15%, nutmeg 12%, allspice 16%, capsicum 16%, and onion 9%. Use at the rate of 3.8 ounces per 100 gallons of catsup.

A typical catsup recipe is:

| Tomato Catsup (from paste) | |
|---|---|
| Tomato paste (27% S.S.) | 275 parts |
| Vinegar (50 grain - white) | 150 parts |
| Sugar (or equivalent) | 75 parts |
| Water | 50 parts |

The flavoring mixture may be added as is, or shaken with several volumes of either the water or vinegar before adding to the mixer.

5. French Dressing.

The spice oleoresin portion of a typical "w/o flavor" comprises paprika 60%, capsicum 5%, black pepper 25%, clove 5%, allspice, pimento 2%, and onion 3%.

Use 0.225 pounds flavoring composition per 100 pounds dressing. The flavoring mixture may be added as is during the mixing if the dressing is single filled (after mixing aqueous and oil phases), or dispersed into either the aqueous or oil phase if it is double filled (vinegar added first, then oil). A typical French dressing formulation is:

| Vegetable Oil | 185 | parts |
|---|---|---|
| Sugar | 150 | parts |
| Tomato Paste (32% solids) | 35 | parts |
| Vinegar (200 grain) | 20 | parts |
| Salt | 11.25 | parts |
| Water | 92.50 | parts |
| Kelcolid Gum L.V. | 1.10 | parts |
| Mustard Flour | 2.50 | parts |
| Onion Juice | 5.00 | parts |

6. Meat Pies.

The spice oleoresin portion of a typical meat pie "w/o flavor" may contain: celery 30%, black pepper 50%, turmeric 10%, paprika 5%, onion 4%, and garlic 1%. The flavoring mixture is preferably added as is, or as a dilute dispersion in water or fat, preferably at the end of the simmering of the gravy, to avoid volatilization of the flavorings. It is used at about 1 part to 4,000.

The gravy, which is used as a filling for the meat pie, may consist of:

Meat Pies—Chicken

A typical formula for the gravy filling used in making chicken pies is:

| Chicken Broth and Emulsified Skins | 3840 | parts |
|---|---|---|
| Chicken Fat | 110 | parts |
| Salt | 25 | parts |
| Milk Powder | 25 | parts |
| Wheat Flour | 30 | parts |
| Corn Starch - Modified | 65 | parts |
| Frozen Peas and Carrots | 400 | parts |
| Diced Pimentoes | 15 | parts |
| MSG (monosodiumglutamate) | 8 | parts |

7. Sliced Apple Rings.

The spice oleoresin portion of the "w/o flavor" may comprise 60% cinnamon and 40% cloves. It is used at a rate of about 1 part in 1500 in the hot covering syrup, to which it may be added directly or as a dispersion in water.

A typical covering syrup may consist of:

| Sugar | 400 | pounds |
|---|---|---|
| F.D.&.C. Red 40 | 1.75 | pounds |
| Malic Acid | .75 | pounds |
| Water - Quantity sufficient or | 100 | gallons |

Example 8. Stability of "w/o flavor" compositions containing a predominant amount of oleoresin black pepper.

As mentioned in the discussion of the prior art, it is difficult to prevent crystals of piperine from forming in flavorings containing oleoresin of black pepper. The lactic acid solutions of Johnson, when containing all the components of the essential oil of black pepper, becomes two phases, and are incompatible with many fatty type oleoresins, such as paprika or celery. The ethanolic-organic acid preparations of Yanick, although single phase, likewise do not form stable mixtures with other fatty oleoresins. One of the principal advantages of this invention is its broad applicability, as the following examples of stable flavorings show.

A. Italian Sausage Flavor. This consists of a mixture of 24% by weight of oleoresin black pepper, 8% coriander, 6% paprika, 12% fennel, 25% hydroxylated lecithin, 25% tartaric acid esters of mono- and diglycerides.* Upon standing, no piperine crystals formed. To make certain that they would not form upon agitation and prolonged storage, the mixture was seeded with pure piperine crystals. No crystallization of piperine occurred.

This seasoning may be used in a manner similar to the wiener seasoning described in Example 1.

B. Soup Flavor. This consists of 42% celery, 22% black pepper, 18% hydroxylated lecithin, and 18% tartaric acid esters*. Piperine crystals did not form under the conditions described above. Substituting Polysorbate 80, for the above lecithin and tartaric acid esters, resulted in precipitation of the piperine.

This advantageous and desirable solubilization of piperine is both unexpected and critical to the success of this invention, as it allows black pepper oleoresin to be used in liquid flavoring systems, containing other essential oil or oleoresin flavors. This is not feasible according to the existing knowledge or practice of the art.

Example 9. Artificial flavorings and colorings.

The previous examples have limited themselves to the use of natural flavorings and colorings. This invention, however, encompasses all condiments, whether they be natural or synthetic. For example, synthetic capsanthin, lycopene, or beta-apo-8 carotenal can be substituted for the oleoresin paprika in the above examples, in the manner known to the art for matching tinctorial power. Synthetic beta-carotene can be substituted for an extract of annatto, in which the predominant pigment is bixin or, if saponified, norbixin. Synthetic cinnamon can be substituted for oleoresin cinnamon, vanillin for vanilla extract, and so on. A more complete list of flavors which may be present includes dill, garlic, ginger, clove, bay, pimento, cassia, caraway, capsicum, celery, coriander, nutmeg, paprika, black pepper, mustard, marjoram, thyme, sage, basil, spearmint, peppermint, lemon oil, orange oil, and tarragon. inter alia.

One versed in the art will discern that this invention applies to any condiment, whether it be natural or synthetic, a flavor or a color, a single substance or a mixture of substances.

Example 10. Beverages and Juices.

As pointed out in the prior description of the invention, the "w/o flavors" are not water soluble, but rather are only water dispersible. Upon standing in water alone, they will tend to separate. This is particularly true if the "w/o flavor" contains oleoresins, such as paprika or celery, which contain large amounts of vegetable oils.

However, this invention provides such a fine dispersion of the oleoresins that they may be used to flavor and color beverages, including juices, containing sufficient suspended matter (cloud or fibers) to absorb the dispersed "w/o flavor". Thus, 0.5 g. "w/o flavor" paprika and 0.15 g. "w/o flavor" celery was stirred into commercial tomato juice, which thereupon became redder and had a noticeable celery flavor. Neither the paprika nor celery separated from the juice. Similarly, a "w/o flavor" of annatto extract can be used to impart an orange color to an orange or grapefruit drink.

Example 11. Selective flavoring and coloring of water and oil phases.

Most condiments contain mixtures of flavors and colors, some of which are more oil soluble and some of which are more water soluble. One of the purposes of this invention is to provide a system which will enable the chef to distribute the constituents of the condiment between the oil and water phases to obtain a result similar to that which can be obtained in a home kitchen, or for other reasons.

For example, if "w/o flavor" paprika is added to oil, and then shaken with vinegar, the oil only is colored. If, however, the "w/o flavor" paprika is shaken with the vinegar, oil added, and the mixture then shaken again, a portion of the color remains in the vinegar. If "w/o flavor" celery is similarly treated, the water and oil soluble flavors will similarly partition. The utility of this aspect of the invention is considerable, as will be apparent to a food technologist.

It is to be understood that the invention is not to be limited to the exact details of operation or exact compounds, compositions, methods, or procedures shown and described, as obvious modifications and equivalents will be apparent to one skilled in the art.

TABLE I

Comparison of important attributes of systems for using spice oleoresins and essential oils for flavoring/coloring. Code: y = yes, blank = no

| Characteristic | Spray Dry | Poly-80 Mixtures | Johnson | Yanick | Dispersions | Gums | "w/o flavor" of this invention |
|---|---|---|---|---|---|---|---|
| Single phase system | | y | y | | | | y |
| Stable on heating and cooling, crystal seeding, ect. | y | y | | | | | y |
| Compatible with systems containing | | | | | | | |
| oleoresins only | y | y | | | color loss | | y |
| essential oils only | y | y | | | y | | y |
| oleoresins and oils as blends | y | y | | | y | | y |
| Contains no off flavors due | | | | | | | |
| to emulsifiers | | | | | y | y | y |
| to high acid content | y | y | | | y | y | y |
| Flavor stable to exidation under storage | | | y | y | | | y |
| Water dispersible by stirring | | y | | | | | y |
| Flavoring efficiency 100% in all applications | y | | | | | | y |

TABLE II

Summary of foods which can be advantageously seasoned by various flavoring systems.

| | Spray Dry | Polysorbate 80 USP | Johnson | Yanick | Dry Dispersions | Gums | "w/o flavor" of this invention |
|---|---|---|---|---|---|---|---|
| Fruits | | | | | x | | x |
| Tomato Products, | | | | | x | | x |
| Ketchup | | | | | x | | x |
| Meats | | | | | x | | x |
| Chili | | | | | | | x |
| Soups | | | x | | x | | x |
| Baked Products | | | | | | | x |
| Fillings | x | | | | | | x |
| Pourable Dressings | | | | x | x | | x |
| Spoonable Dressings | | | | x | x | | x |
| Cheese | | | | | | x | x |
| Sauces | | x | | | | | x |
| Dry Mixes | x | | | | | | x |
| Pickles | | x | | | | | |
| Mustard | | x | | | | | x |

We claim:

1. A homogeneous liquid condimental composition, useful in flavoring or coloring foods and beverages and which is dispersible in both oil and water, consisting essentially of
   (1) hydroxylated lecithin,
   (2) tartaric acid esters of mono- and diglycerides, and
   (3) one or more condiments selected from edible flavorings and edible colorings, the ratio by weight of (1) plus (2) to
   (3) being at least 1:4.

2. Composition of claim 1, wherein the ratio of (1) plus (2) to (3) is at least 1:3.

3. Composition of claim 1, wherein the weight ratio of (2) to (1) is between about 1:3 and 3:1.

4. Composition of claim 1, wherein the condiment portion (3) comprises at least one condiment selected from the group consisting of (a) spice oleoresins, (b) essential oils, and (c) edible colorings.

5. Composition of claim 1, wherein the condiment portion (3) comprises a spice oleoresin.

6. Composition of claim 5, wherein the spice oleoresin is oleoresin black pepper.

7. Composition of claim 1, wherein ingredients (1) and (2) are present in about a 1:1 weight ratio.

8. Composition of claim 7, wherein the condiment portion (3) is a spice oleoresin.

9. Composition of claim 1, wherein ingredients (1), (2), and (3) are present in about a 1:1:2 ratio by weight.

10. Composition of claim 9, wherein the condiment portion (3) is a spice oleoresin.

11. Composition of claim 1, comprising an edible coloring in an amount between about one and about twenty percent by weight of the composition.

12. Composition of claim 11, wherein the edible coloring is selected from the group consisting of annatto extract, bixin, norbixin, lycopene, capsanthin, beta-apo-8 carotenal, and beta-carotene.

13. Composition of claim 1, comprising at least one preferentially water-soluble condiment (3), said composition being dispersed in water and then admixed with oil, said water-soluble condiment being present in the aqueous phase.

14. Composition of claim 1, wherein the condiment portion (3) in the composition is other than oleoresin black pepper, blended with an oleoresin black pepper composition of claim 6.

15. Composition of claim 1, wherein a portion of either or both of (1) and (2) is replaced by a polyglycerol having six or more glyceride linkages which is essentially a monoester of a fatty acid, in an amount of up to about fifty percent of the combined weight of (1) and (2).

16. A food seasoned, flavored, or colored with a condimental composition according to claim 1.

17. A beverage seasoned, flavored, or colored with a condimental composition according to claim 1.

* * * * *

UNITED STATES PATENT AND TRADEMARK OFFICE
CERTIFICATE OF CORRECTION

PATENT NO. : 4,283,429
DATED : August 11, 1981
INVENTOR(S) : Paul H. Todd, Jr. and Howard E. Haley It is certified that error appears in the above—identified patent and that said Letters Patent is hereby corrected as shown below:

Col. 2, line 50; "begetable" should read -- vegetable --
Col. 4, lines 32 & 33; "and-      should be hyphenated    -- and/-
                       /or"       like this               or --
Col. 5, line 19; "Faty" should read -- Fatty --
Col. 8, line 64; "weigh" should read -- weight --
Col. 9, Table B, in table heading, line 3; "Floating" should read
 -- floating --
Col. 9, Table B, under column heading "Immediate", last line; "dispersbile"
 should read -- dispersible --
Col. 9, line 33, after "monooleate.", "EXAMPLES PROVIDING" should be
 a new line.

Signed and Sealed this

Twenty-third Day of February 1982

[SEAL]

Attest:

GERALD J. MOSSINGHOFF

Attesting Officer      Commissioner of Patents and Trademarks